United States Patent [19]

Moon

[11] Patent Number: 4,894,719
[45] Date of Patent: Jan. 16, 1990

[54] SYNCHRONIZING SIGNAL AUTOMATIC SELECTING CIRCUIT

[75] Inventor: Ik H. Moon, Kyungsangbook, Rep. of Korea

[73] Assignee: Goldstar Co., Ltd., Seoul, Rep. of Korea

[21] Appl. No.: 223,551

[22] Filed: Jul. 25, 1988

[30] Foreign Application Priority Data

Jul. 30, 1987 [KR] Rep. of Korea ................. 8367/1987

[51] Int. Cl.$^4$ .............................................. H04N 5/08
[52] U.S. Cl. .................................... 358/153; 358/148
[58] Field of Search ................. 358/17, 148, 149, 150, 358/152, 153, 154, 181

[56] References Cited

U.S. PATENT DOCUMENTS 4,709,267 11/1987 Sendelweck ....................... 358/148

Primary Examiner—John W. Shepperd
Assistant Examiner—Michael D. Parker
Attorney, Agent, or Firm—Rosen, Dainow & Jacobs

[57] ABSTRACT

A synchronizing signal automatic selecting circuit comprising a signal inverter for inverting synchronizing signal from a synchronizing signal separating circuit, a synchronizing signal detector for detecting synchronizing signal when a synchronizing signal is inputted to a horizontal and horizontal/vertical synchronizing signal input terminal and grounding the output signal of the signal inverter, a polarity detecting circuit for detecting the synchronizing signal polarity of the horizontal and horizontal/vertical synchronizing signal input terminal and a vertical synchronizing signal separator for separating the vertical synchronizing signal from the output signal of a transistor. The circuit is designed to automatically select with priority the synchronizing signal where the composite video signal and the synchronizing signal are inputted at the same time to a monitor used for a peripheral equipment of a computer without using a switch.

6 Claims, 4 Drawing Sheets

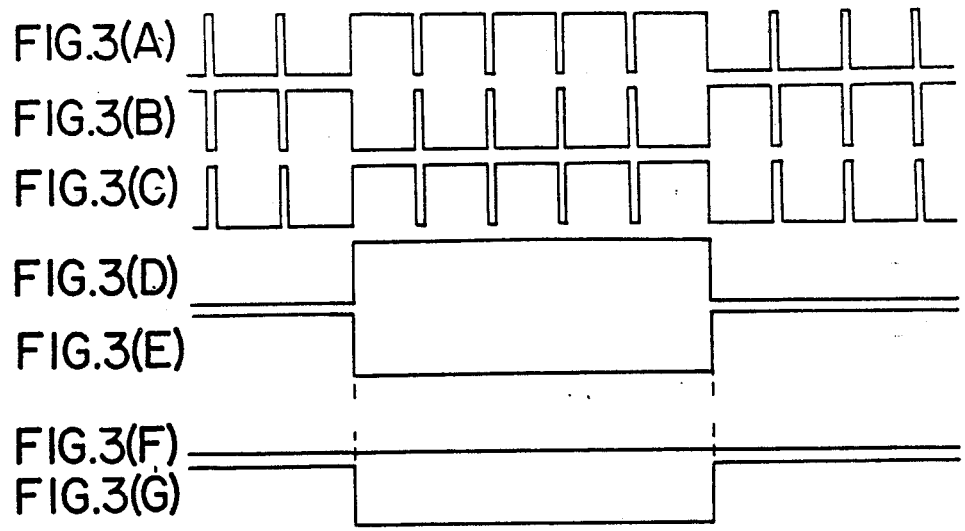
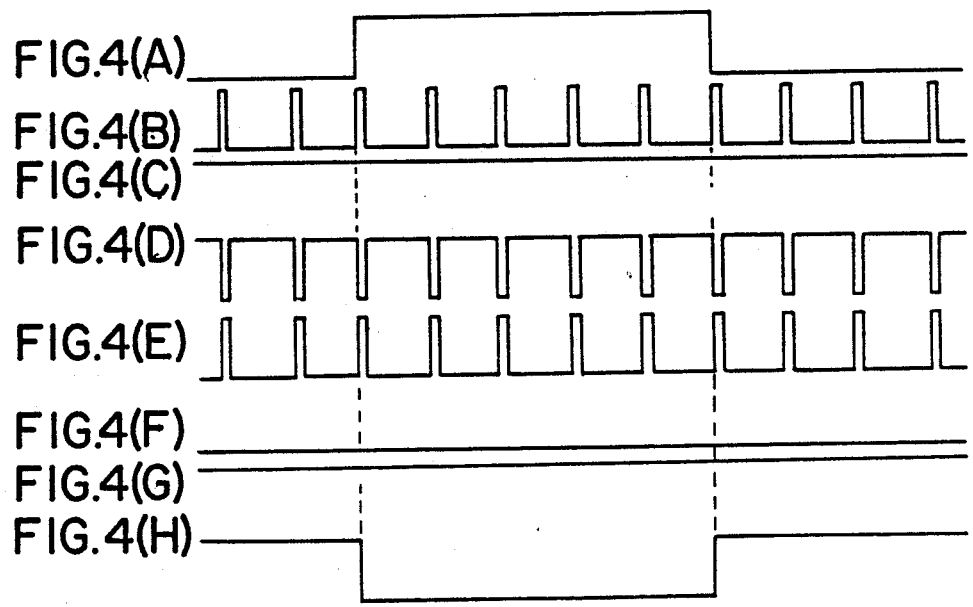

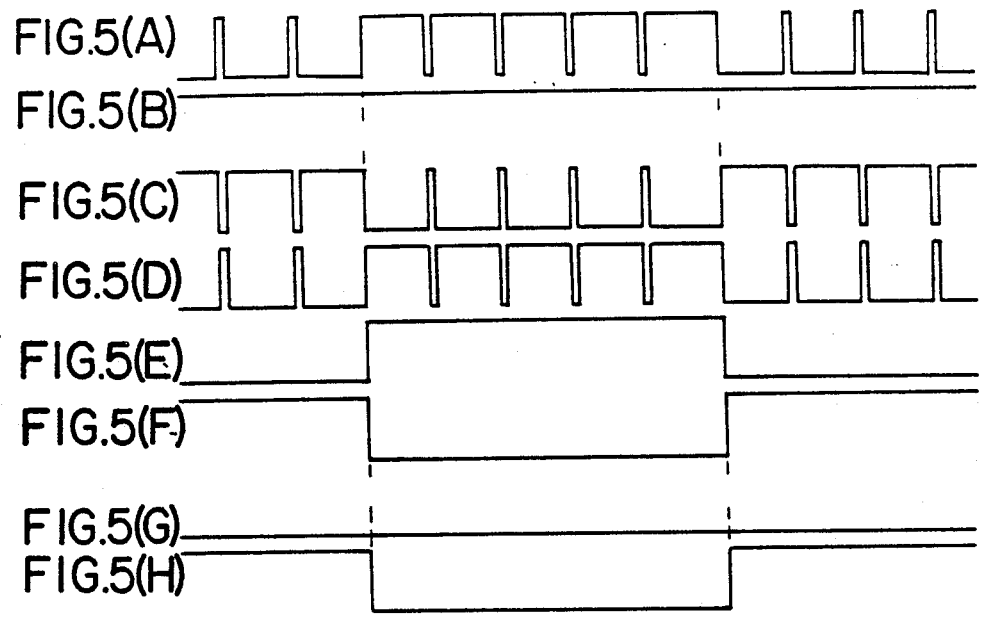

SYNCHRONIZING SIGNAL AUTOMATIC SELECTING CIRCUIT

BACKGROUND OF THE INVENTION

1. Field of the Invention

The present invention relates to a synchronizing signal selecting circuit which can select one of various synchronizing signals when various synchronizing signals are inputted to a monitor used for peripheral equipment of a computer, and more particularly it relates to a synchronizing signal automatic selecting circuit designed to select the synchronizing signal which has priority in when a composite video signal and a synchronizing signal are inputted to the monitor at the same time.

2. Description of the Prior Art

As shown in FIG. 1, the conventional synchronizing signal selecting circuit is designed to select one synchronizing signal according to the selection of switches $SW_1, SW_2$. That is to say, in a state that switches $SW_1, SW_2$ are short-circuited to fixed terminals $a_1, a_2$ on one side, horizontal and vertical synchronizing signals inputted to a color signal input terminal G and then synchronized and separated at the synchronizing signal separating circuit 2 are inputted, respectively, to the horizontal synchronizing signal processing circuit 3 and the vertical synchronizing signal processing circuit 4 through the switches $SW_1, SW_2$. Where switches $SW_1, SW_2$ are shortcircuited to the intermediate fixed terminals $b_1, b_2$, the horizontal and vertical synchronizing signals inputted to the synchronizing signal inputted terminals H, V are input, respectively, to the horizontal synchronizing signal processing circuit 3 and the vertical synchronizing signal processing circuit 4 through switches $SW_1, SW_2$. Additionally in a state where switches $SW_1, SW_2$ are short-circuited to the fixed terminals $C_1, C_2$ on the other side, the horizontal and vertical synchronizing signals inputted to the horizontal and vertical synchronizing signals input terminal HV and synchronized and separated at the synchronizing signal separating circuit 5 are inputted to the horizontal synchronizing signal processing circuit 3 and the vertical synchronizing signal processing circuit 4 through switches $SW_1, SW_2$. Therefore, the conventional circuit has a disadvantage in that the user must select the synchronizing signal by changing the switches $SW_1, SW_2$ one by one.

SUMMARY OF THE INVENTION

Therefore, the object of the present invention is to provide a synchronizing signal selecting circuit for selecting automatically the synchronizing signal without using a switch.

The object of a present invention is attained in the manner that in the event that the horizontal and vertical synchronizing signals are not inputted, but the composite video signals are inputted, the synchronizing signals synchronously separated from the composite video signals are divided again into the horizontal and vertical synchronizing signals which are applied to the horizontal and vertical synchronizing processing circuits, respectively, while in the event that the horizontal and vertical synchronizing signals and the composite video signals are inputted at the same time, the synchronizing signals synchronously separated from the composite video signals are cut off and at the same time the horizontal and vertical synchronizing signals are applied to the horizontal and vertical synchronizing signal processing circuits, respectively.

BRIEF DESCRIPTION OF THE DRAWINGS

The present invention will now be described in detail with reference to the accompanying drawings. In the drawings, FIGS. 3 to 5 are wave-form views of each part of FIG. 2.

DETAILED DESCRIPTION OF THE INVENTION

Figure 1:
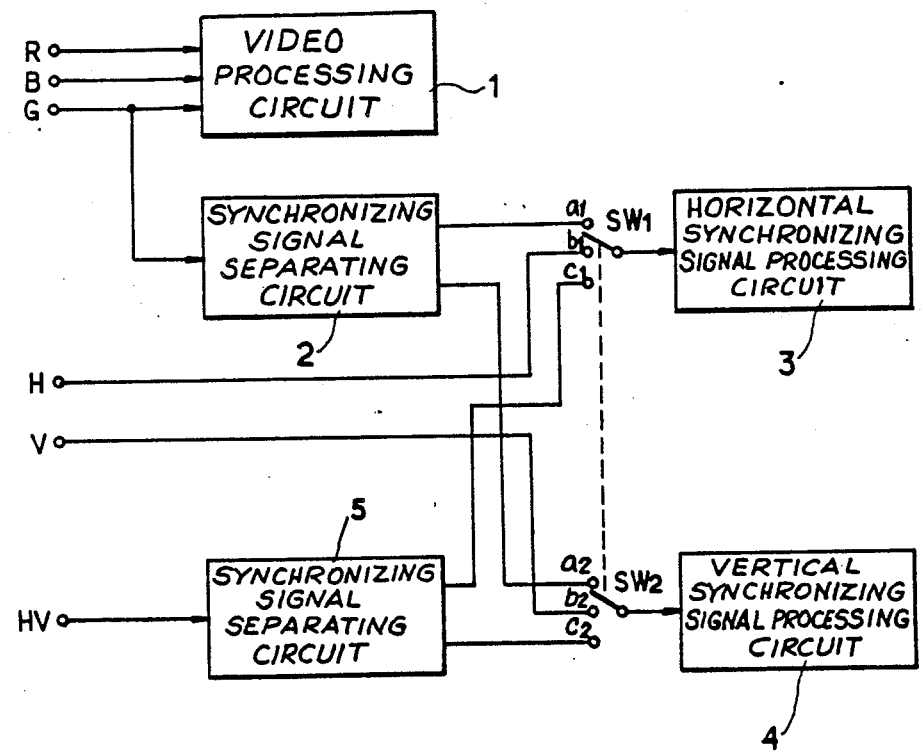
FIG. 1 is a conventional synchronizing signal selecting circuit.
Figure 2:
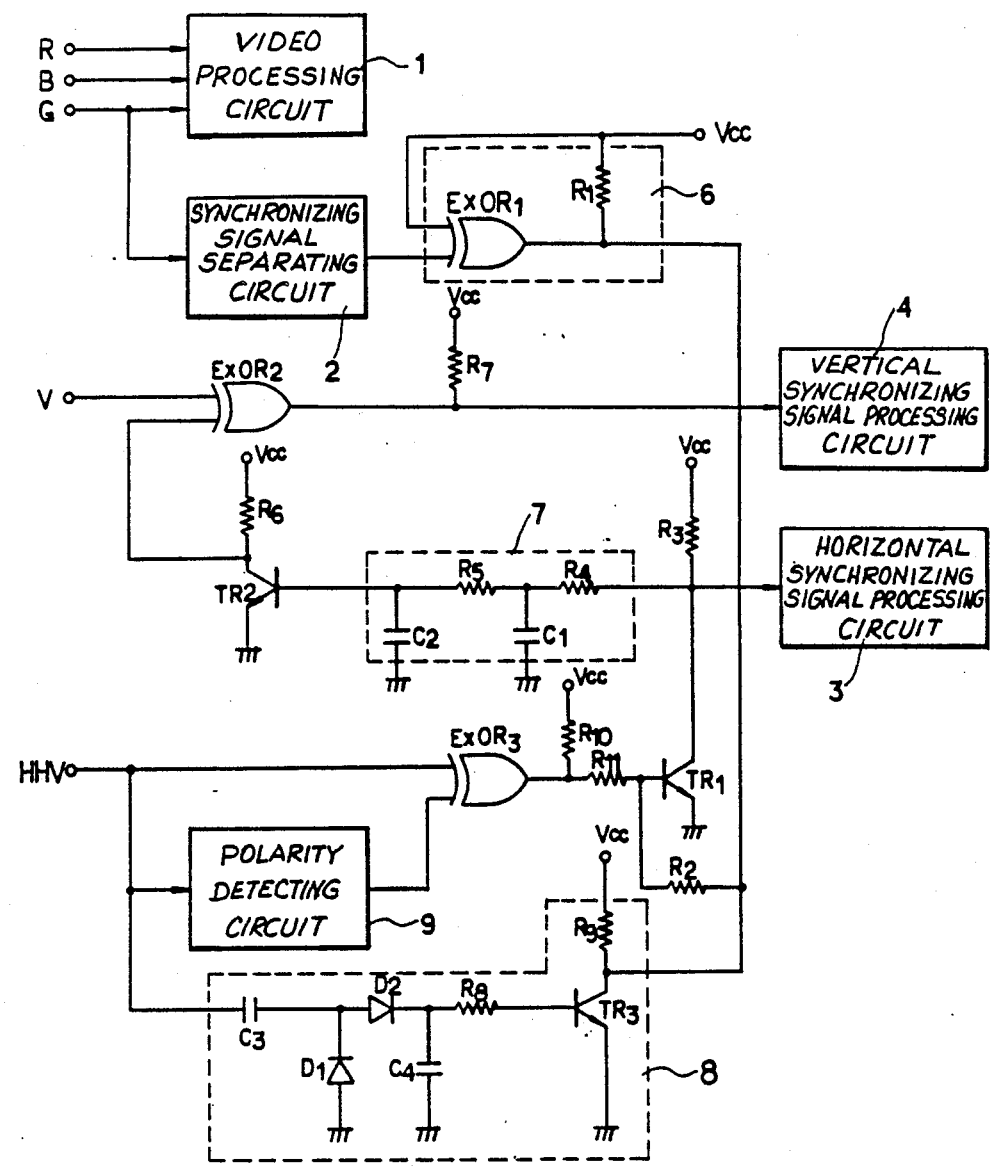
FIG. 2 is a synchronizing signal automatic selecting circuit according to the present invention.

FIG. 2 is a synchronizing signal automatic selection circuit according to the present invention, and as shown in FIG. 2, the output side of a synchronizing signal separating circuit 2 connected to a color signal input terminal G is connected to the base of a transistor $TR_1$ through a resistor $R_2$ and a signal inverter 6 consisting of an exclusive OR-gate $EXOR_1$ and a resistor $R_1$; horizontal and horizontal/vertical synchronizing signal input terminal HHV is connected to the connecting point of the output side of the signal inverter 6 and the resistor $R_2$ through a synchronizing signal detecting circuit 8 consisting of capacitors $C_3, C_4$, diodes $D_1, D_2$, resistors $R_8, R_9$ are transistor $TR_3$; the horizontal and horizontal/vertical synchronizing signal input terminal HHV is also connected to one input terminal of the exclusive OR-gate $EXOR_3$ and time to the other side input terminal of the exclusive OR-gate $EXOR_3$ through a polarity detecting circuit 9, while the output terminal of the exclusive OR-gate $EXOR_3$ is connected to the base of the transistor $TR_1$ through the resistor $R_{11}$; the collector of said transistor $TR_1$ is connected to the input terminal of the horizontal synchronizing signal processing circuit 3 and the resistor $R_3$ connected to the power terminal VCC and at the same also to the base of the transistor $TR_2$ through the vertical synchronizing signal separator circuit 7 consisting of resistors $R_4, R_5$ and capacitors $C_1, C_2$.

The collector of the transistor $TR_2$ is connected to one input terminal of the exclusive OR-gate $EXOR_2$ and the resistor $R_6$ connected to the power terminal Vcc, and the vertical synchronizing signal input terminal V is connected to the other input terminal of the exclusive OR-gate $EXOR_2$, while the output terminal of the exclusive OR-gate $EXOR_2$ is connected to the input terminal of the vertical synchronizing signal processing circuit 4 and the resistor $R_7$. The reference R,B in the description of the drawings are color signal input terminals, and reference numeral 1 is a video processing circuit.

The operation and effect of the present invention as described above will now be described in more detrail with reference to the wave-form of FIGS. 3 to 5.

As the power source is supplied to the power terminal Vcc, and the color signal which is a composite video signal, is inputted to the color signal inputted terminals R,B,G, the color signal is input to the video processing circuit 1 and processed therein. At this moment the color signal inputted to the color signal input terminal G is inputted to the synchronizing signal separating circuit 2 resulting in the synchronizing signal of the color signals being outputted as shown in FIG. 3(A).

This output synchronizing signal is inverted by and outputted from the signal inverter 6 as shown in FIG. 3(B).

When no synchronizing signal is input to the horizontal and horizontal/vertical synchronizing signal input terminal HHV, the transistor $TR_3$ of the synchronizing signal detecting circuit 8 turns OFF, and a high level signal is outputted to the collector thereof, and no synchronizing signal polarity being detected from the polarity detecting circuit 9, a low level signal is outputted to the outputted terminal so that low level signals are output continuously to the outputted terminal of the exclusive OR-gate $EXOR_3$. Accordingly the synchronizing signal output from the signal inverter 6 is applied to the base of the transistor $TR_1$ through the resistor $R_2$ so that the synchronizing signal is inverted and outputted to the collector as shown in FIG. 3(C).

As described above, the synchronizing signal output to the collector of the transistor $TR_1$ is applied to and processed in the horizontal synchronizing signal processing circuit 3. Since the synchronizing signal is applied to the vertical synchronizing signal separator 7, the vertical synchronizing signal is separated as shown in FIG. 3(D), and applied to the base of the transistor $TR_2$. Accordingly, the synchronizing signal applied to the base of the transistor $TR_2$ is inverted as shown in FIG. 3(E) and outputted to the collector thereof and applied to the other input terminal of the exclusive OR-gate $EXOR_2$. When no vertical synchronizing signal is, at this moment, inputted to the vertical synchronizing signal input terminal V, low level signal is applied to the other side input terminal of the exclusive OR-gate $EXOR_2$ as shown in FIG. 3(F) so that the vertical synchronizing signal applied to the other input terminal of the exclusive OR-gate $EXOR_2$ is inverted and outputted as shown in FIG. 3(G), and this vertical synchronizing signal is applied to and processed in the vertical synchronizing signal processing circuit 4.

Meanwhile, as the vertical synchronizing signal and horizontal synchronizing signal separated as shown in FIG. 4(A) and (B) are inputted to the vertical synchronizing signal input terminal V and the horizontal and horizontal/vertical synchronizing signal input terminal HHV, respectively, the horizontal synchronizing signal is full wave rectified at the capacitors $C_3, C_4$ an diodes $D_1, D_2$ of the synchronizing signal detecting circuit 8 and then applied to the base of the transistor $TR_3$ so that the transistor $TR_3$ turns to its ON-state. Consequently at this moment the synchronizing signal output from the signal inverter 6 is ground through the transistor $TR_3$. Since the horizontal synchronizing signal is applied to one input terminal of the exclusive OR-gate $EXOR_3$, and at the same time the polarity of said horizontal synchronizing signal is detected by the polarity detecting circuit 9, a high level signal is applied to the other side input terminal of the exclusive OR-gate $EXOR_3$ as shown in FIG. 4(C). Accordingly the horizontal synchronizing signal applied to the one input terminal of the exclusive OR-gate $EXOR_3$ is inverted at and outputted from the output terminal of said exclusive OR-gate $EXOR_3$ as shown in FIG. 4(D), and this output signal is applied to the base of transistor $TR_1$ through the resistor $R_{11}$ so that the horizontal synchronizing signal is outputted from the collector thereof as shown in FIG. 4(E).

This output horizontal synchronizing signal is applied to and processed in the horizontal synchronizing signal processing circuit 3, and said horizontal synchronizing signal is applied to the vertical synchronizing signal separated 7. However, since said horizontal synchronizing signal includes no vertical synchronizing signal, a low level signal is outputted from the output side of the vertical synchronizing signal separator 7 as shown in FIG. 4(F), and accordingly the transistor $TR_2$ turns OFF so that a high level signal is applied to the other side input terminal of the exclusive OR-gate $EXOR_2$ as shown in FIG. 4(G).

Therefore, the vertical synchronizing signal input to the vertical synchronizing signal input terminal V is inverted in the exclusive OR-gate $EXOR_2$ as shown in FIG. 4(H) and applied to the vertical synchronizing signal processing circuit 4.

Meanwhile, as shown in FIG. 5(A), when the synchronizing signal in which the horizontal and vertical synchronizing signals are combined, is inputted to the horizontal and horizontal/vertical synchronizing signal input terminal HHV, the synchronizing signal is detected at the synchronizing signal detecting circuit 8 and the transistor $TR_3$ turns to its ON-state, and accordingly the output signal of said signal inverter 6 is ground. A high level signal is outputted from the polarity detecting circuit 9 as shown in FIG. 5(B) and applied to the other input terminal of the exclusive OR-gate $EXOR_3$.

Therefore, the synchronizing signal input to the horizontal and horizontal/vertical synchronizing signal input terminal HHV is inverted at the exclusive OR-gate $EXOR_3$ as shown in FIG. 5 (C) and inverted again at the transistor $TR_1$ as shown in FIG. 5(D) and applied to the horizontal synchronizing signal processing circuit 3. The vertical synchronizing signal which is contained in the synchronizing signals outputted to the collector of the transistor $TR_1$ is separated at the vertical synchronizing signal separator 7 as shown in FIG. 5(E) and applied to the base of the transistor $TR_2$. Consequently the vertical synchronizing signal is outputted to the collector of the transistor $TR_2$ as shown in FIG. 5(F) and applied to the other input terminal of the exclusive OR-gate $EXOR_2$. Since no vertical synchronizing signal is inputted to the vertical synchronizing signal input terminal V a low level signal is thereby applied to one input terminal of the exclusive OR-gate $EXOR_2$ as shown in FIG. 5(G), the vertical synchronizing signal applied to the other input terminal from the exclusive OR-gate $EXOR_2$ is inverted as shown in FIG. 5(H) and applied to the vertical synchronizing signal processing circuit 4.

As described above in detail, the present invention has an effect such that it is possible to select automatically the synchronizing signal without changing the switch separately, and where the composite video signal and the synchronizing signal are inputted together at the same time, the synchronizing signal of the composite video signal is cut off and the synchronizing signal separately inputted is selected.

What is claimed is:

1. A synchronizing signal automatic selecting circuit having a horizontal and horizontal/vertical synchronizing signal terminal HHV which circuit is coupled to a horizontal synchronizing signal processing circuit, a vertical synchronizing signal processing circuit, and a vertical synchronizing signal input terminal V comprising a synchronizing signal separating circuit for separating a synchronizing signal from color signals or a color signal, a signal inverter means for inverting the synchronizing signal output from said synchronizing signal separating circuit, a synchronizing signal detecting element for detecting the synchronizing signal when the synchronizing signal is inputted to the horizontal and horizontal/vertical synchronizing signal input terminal HHV and grounding the output signal of said signal inverter means, a polarity detecting means for detecting the synchronizing signal polarity of said horizontal and horizontal/vertical synchronizing signal input at said terminal HHV, an exclusive OR-gate for combining the output signal of said polarity detecting means and the synchronizing signal of the horizontal and horizontal/vertical synchronizing signal input terminal, a first transistor for inverting the output signal of said exclusive OR-gate or the output signal of the signal inverter means and applying it to the horizontal synchronizing signal processing circuit, a vertical synchronizing signal separate means for separating the vertical synchronizing signal from the output signal of said first transistor, a second transistor for inverting the output signal of said vertical synchronizing signal separator means and an exclusive OR-gate for combining the output signal of said second transistor and the vertical synchronizing signal of the vertical synchronizing signal input terminal and applying it to the vertical synchronizing signal processing circuit.

2. A synchronizing signal automatic selecting circuit as claimed in claim 1, wherein said vertical synchronizing signal separator means comprises a first capacitor, first and second resistors and a second capacitor and wherein the collector of said first transistor is connected to the base of said second transistor through said resistors.

3. A synchronizing signal automatic selecting circuit as claimed in claim 1, which further includes a means for providing power and wherein said synchronizing signal detecting element comprises a first capacitor, a first diode, a second diode, a second capacitor a first and second resistor and a third transistor, the collector of said third transistor connected to said second resistor, said second resistor connected to the means for providing power and the output side of the signal inverter means and wherein said horizontal and horizontal/vertical synchronizing signal input terminal is connected to the base of said third transistor through said first capacitor said second diode and said first resistor.

4. A synchronizing signal automatic selecting circuit having a horizontal and horizontal/vertical synchronizing signal terminal which circuit is coupled to a horizontal and vertical synchronizing signal processing circuit comprising a synchronizing signal separating circuit for separating a synchronizing signal from color signals or a color signal input, a signal inverter means for inverting the synchronizing signal output from said synchronizing signal separating circuit, a synchronizing signal detecting means for detecting the synchronizing signal when the synchronizing signal is inputted to the horizontal and horizontal/vertical synchronizing signal input terminal and disabling the output signal of said signal inverter means, a polarity detecting means for detecting the synchronizing signal polarity of said horizontal and horizontal/vertical synchronizing signal input, first combining means for combining the output signal of said polarity detecting means and the synchronizing signal of the horizontal and horizontal/vertical synchronizing signal input terminal, a first inverting means for inverting the output signal of said first combining means or the output signal of the signal inverter means and applying it to the horizontal synchronizing signal processing circuit, a vertical synchronizing signal separator means for separating the vertical synchronizing signal if present from the output signal of said first inverting means, a second inverting means for inverting the output signal of said vertical synchronizing signal separator, and a second combining means for combining the output signal of said second inverting means and the vertical synchronizing signal at the vertical synchronizing signal input terminal and applying it to the vertical synchronizing signal processing circuit.

5. The synchronizing signal automatic selecting circuit of claim 4, wherein said first and second combining means comprise exclusive OR-gates.

6. A synchronizing signal automatic selecting circuit for separating a synchronizing signal from one of (a) color signals or a color signal at an input terminal G, (b) a horizontal and horizontal/vertical synchronizing signal at an input terminal HHV, or (c) a vertical synchronizing signal at an input terminal V, comprising: a synchronizing signal separating circuit connected to the terminal G, signal inverter means connected to and for inverting the synchronizing signal output from said synchronizing signal separating circuit, synchronizing signal detecting means connected to the terminal HHV for detecting when a synchronizing signal is inputted and disabling the output signal of said signal inverter means, polarity detecting means connected to and for detecting the signal polarity of signals at input terminal HHV, first logical means for logically combining the output signal of said polarity detecting means and the synchronizing signal at input terminal HHV, first inverter means for applying the output signal of said first logical means or the output signal of the signal inverter means to a horizontal synchronizing signal processing circuit, vertical synchronizing signal separator means for separating the vertical synchronizing signal if present from the output signal of said first inverter means, second inverter means connected to the output of said vertical synchronizing signal separator means, second logical means for logically combining the output signal of said second inverter means and a signal at input terminal V, and means for connecting the output of the second logical means to a vertical synchronizing signal processing circuit.

* * * * *